United States Patent [19]

Martin

[11] Patent Number: 5,775,664

[45] Date of Patent: Jul. 7, 1998

[54] ANCHOR FASTENING DEVICE

[76] Inventor: Andrew T. Martin, 20960 Brant Ave., Carson, Calif. 90810

[21] Appl. No.: 615,424

[22] Filed: Mar. 14, 1996

Related U.S. Application Data

[63] Continuation of Ser. No. 308,681, Sep. 19, 1994, abandoned, which is a continuation of Ser. No. 96,881, Jul. 26, 1993, abandoned.

[51] Int. Cl.⁶ .................................................. B61D 45/00
[52] U.S. Cl. ........................... 248/500; 248/499; 105/476; 410/101; 410/102; 294/1.1
[58] Field of Search ........................ 248/500, 499; 410/101, 102, 106; 294/1.1, 82.1; 105/476, 485

[56] References Cited

U.S. PATENT DOCUMENTS

| | | | |
|---|---|---|---|
| 1,516,489 | 11/1924 | Barton. | |
| 2,688,504 | 9/1954 | Parker | 248/298 |
| 3,297,293 | 1/1967 | Andrews et al. | 248/361 |
| 4,064,811 | 12/1977 | Copeland | 105/476 |
| 4,431,352 | 2/1984 | Andrews | 410/101 |
| 4,570,987 | 2/1986 | Wong et al. | 294/1.1 |
| 4,592,686 | 6/1986 | Andrews | 410/101 |
| 4,630,982 | 12/1986 | Fenner | 410/102 |
| 4,699,410 | 10/1987 | Seidel | 294/1.1 |
| 4,863,205 | 9/1989 | Schron et al. | 294/82.28 |
| 5,248,176 | 9/1993 | Fredriksson | 294/1.1 |

*Primary Examiner*—Alvin C. Chin-Shue
*Assistant Examiner*—Long Dinh Phan
*Attorney, Agent, or Firm*—Fulwider Patton Lee & Utecht, LLP

[57] ABSTRACT

A hold down incorporating a mounting plate configured with a downwardly opening recess and an elevated retainer collar configured with an aperture. A swivel is configured with an enlarged-in-diameter retainer head received in such recess and an upwardly projecting pivot shank configured with a cross bore which receives a circular retainer ring having an outside diameter larger than such aperture so that such ring and the retainer head cooperate to positively lock the swivel to the mounting plate.

4 Claims, 2 Drawing Sheets

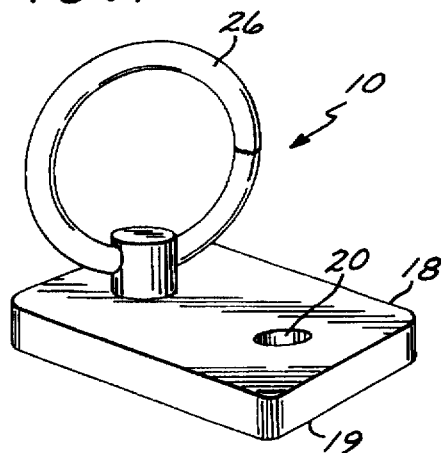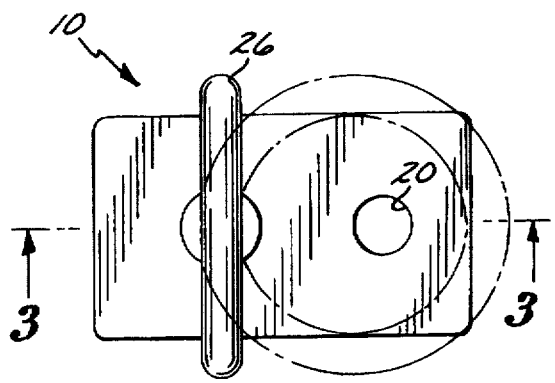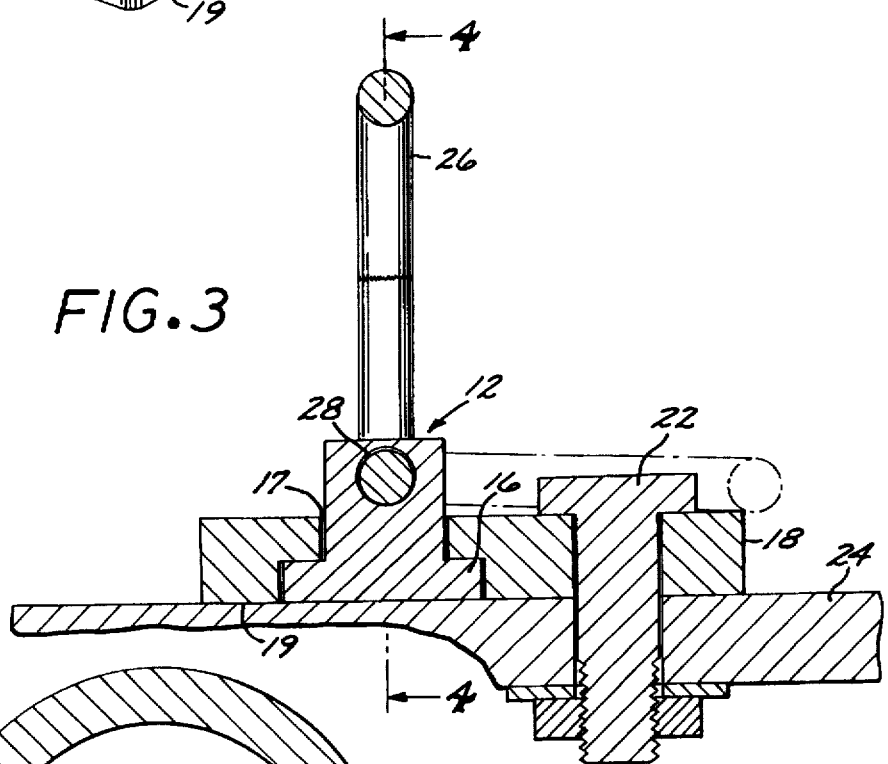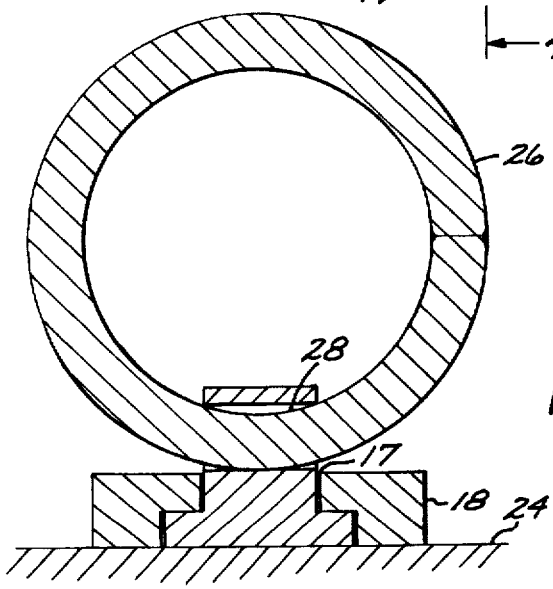

ANCHOR FASTENING DEVICE

RELATED APPLICATION

This is a continuation of Ser. No. 08/308,681, filed Sep. 19, 1994, abandoned, which is a continuation of Ser. No. 08/096,881, filed Jul. 26, 1993, abandoned.

BACKGROUND OF THE INVENTION

1. Field of the Invention

The present invention provides a fastener device which utilizes a load ring swivably mounted to a collar, the collar being mounted through an aperture to a plate member, the plate member in turn being secured by a fastener to a base member through an aperture spaced from the collar mounting aperture.

2. Description of the Prior Art

A number of multi-positioning fasteners have been disclosed in the prior art. For example, U.S. Pat. No. 3,297,293 to Andrews et al. discloses a fastening device for anchoring its load to a base which includes a load, or swivel, ring freely rotated in either direction for a full 360 degrees about an axis and an eye member pivotable on an axis to the ring member axis for substantially 180 degrees. U.S. Pat. Nos. 4,431,352 to Andrews, 4,570,987 to Wong et al. and 4,863,205 to Schron et al. disclose various improvements to the fastener device disclosed in the Andrews patent but all incorporate the 360 degree/180 degree movement shown in that patent.

A common feature of many prior art hold down devices is that they provide mounting plates or shoes formed with upwardly opening apertures or slots for passage of a swivel shank or the like which has an enlarged head on its lower end to be releasably retained under a top wall of the housing. A device of this type is shown in U.S. Pat. No. 5,248,176 to Fredriksson. This hold down incorporates a circular plate typically formed with a recess having an elevated retaining collar which is formed at its opposite side with diametrically radially outwardly projecting clearance recesses for passage of the opposite sides of a D ring carried from a central swivel. In this manner, the swivel can be easily separated from the hold down plate by merely aligning the D ring with the clearance slots. As a result, when workmen store a number of such devices in their storage bins or containers for selection at the work site and installation, the swivels often become disassociated from the anchor plates, thus requiring the workmen to search for the disassociated parts and reassemble same for installation. This proves to be a time consuming and distracting task. Additionally, in the case of a D ring of this type, when a load is applied laterally in the extended plane of the D ring, such D ring may take the load without pivot of the swivel, thus asymmetrically loading the D ring to apply high torque thereto often resulting in bending and permanently deforming the D ring to thus destroy the part.

Other efforts to provide quick disconnect couplers have led to proposals of an anchor shoe configured with a top wall overlying a central recess and configured with a diametrical hour glass shaped slot configured centrally with confronting flanges under which the opposite sides of a retainer head of a swivel pin might be received to be removably locked in position by a retainer fitting received in the enlarged opposite ends of such slot. A device of this type is shown in U.S. Pat. No. 4,064,811 to Copeland. Devices of this type, while being satisfactory for their intended purpose of a quick release retainer mechanism, suffer the shortcoming that the swivel can easily be removed from the shoe and become disassociated therefrom and misplaced, thus requiring, at the minimum, a certain amount of assembly time and, in the extreme, loss of the swivel.

Thus, there exists a need for a hold down apparatus wherein the swivel is permanently mounted to the hold down plate and is configured in such a manner that a load supplied from any direction to the swivel ring will slide to the most distal part of such ring causing the geometry of the applied force to pivot the swivel so that the load is applied in a direct line through the diametrical center of the ring to avoid any side loading thereof.

SUMMARY OF THE PRESENT INVENTION

The present invention is characterized by an anchor plate formed with a central, downwardly opening recess and configured at its top side with a retainer collar configured with an aperture of a predetermined diameter. A swivel is configured with a pivot shank projecting through the aperture and is formed on its bottom end with an enlarged retainer head received in such recess. The swivel shank is formed at its upper extremity with a through cross bore which receives a circular retainer ring having an outside diameter greater than that of the aperture so that the collar is essentially sandwiched between the retainer head and retainer ring to prevent separation of the swivel from the mounting plate.

DESCRIPTION OF THE DRAWING

For a better understanding of the invention as well as other objects and further features thereof, reference is made to the following description which is to be read in conjunction with the accompanying drawing wherein:

FIG. 1 is a perspective view of the fastener of the present invention;

FIG. 2 is a top plan view of the fastener shown in FIG. 1;

FIG. 3 is a side elevational view in cross-section along line 3—3 of FIG. 2;

FIG. 4 is a cross-sectional view along line 4—4 of FIG. 3; and

DESCRIPTION OF THE PRESENT INVENTION

Figure 5:
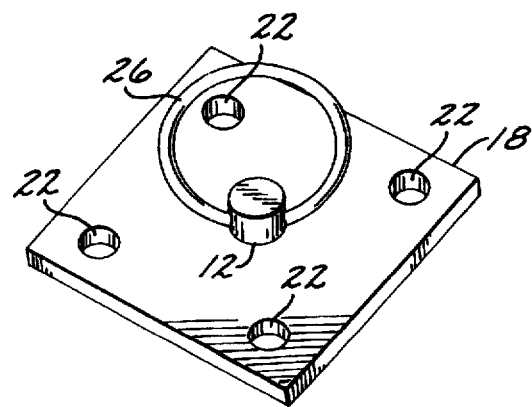
FIGS. 5, 6 and 7 are perspective views of other embodiments of the present invention.

Referring now to FIGS. 1–4, fastening device 10 comprises a swivel stud 12 having a shank portion 14 and an enlarged head 16, the stud passing through an aperture 17 formed by a collar in plate a member 18. An aperture 20 is formed in plate member 18 and a fastener member 22 is provided to attach the plate member 18 to a base 24. A load ring member, or swivel, 26 is secured to shank portion 14 through an aperture forming a cross bore 28 formed therein. It should be noted that the shank portion 14 can be freely rotated in either direction for a full 360 degrees about its axis. In addition, load ring 26 can be pivoted within aperture 28 on an axis essentially transverse to the shank portion axis for substantially 180 degrees.

In the embodiment shown in FIGS. 1–4, fastener 10 is fabricated from ASTM 4130, heat treated to approximately 180,000 psi, aperture 17 consists of a countersunk, or stepped, hole having a collar defining a small diameter of approximately 0.53 inches and a large diameter recess portion of approximately 0.875 inches extending upwards for approximately 0.187 inches from the bottom surface 19 of plate member 18. Plate member 18 is approximately 2.438 inches in length, 1.5 inches in width and 0.375 inches in thickness. Although not required, apertures 17 and 20 are illustrated as being on the same centerline (the spacing therebetween not being critical), the diameter of aperture 20 being approximately 0.40 inches. Shank portion 14 is approximately 0.50 inches in diameter, approximately 0.59 inches in length and the hole formed therethrough to receive the load ring is approximately 0.3125 inches in diameter. Head 16 is approximately 0.156 inches in thickness and has a diameter of approximately 0.813 inches.

The component parts of fastening device 10 are assembled in the conventional manner with the head 16 and ring 26 cooperating to permanently lock the swivel stud to the plate 18 and the fastening device is then secured to the base 24 in the desired location by threaded fastener 22. When the fastening device 10 is secured in place, a load can be attached to the ring member 26 and drawing the connecting member taut. Ring member 26 will pivot freely until it is aligned with such connecting member and aligned in the direction of force applied by such connecting member.

The shank portion 14 is the main tension and shear connection that transmits the vertical component of load in tension and transits the horizontal component of load in shear to the base 24.

Ring member 26 can rotate so that it assumes the load action line.

Figure 6:
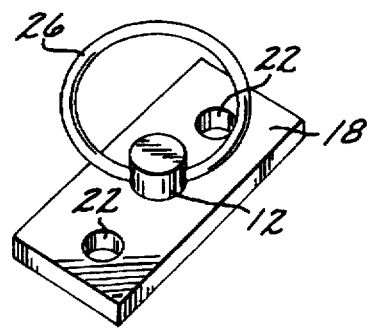
Figure 7:
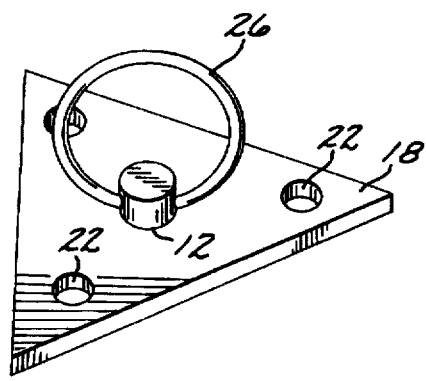

In accordance with the teachings of the present invention, more than one threaded fastener can be used to secure plate member 18 to base member 24. FIG. 5 illustrates the use of four threaded apertures 22, the corresponding fasteners not being illustrated, the stud being substantially centered as shown (if more than one threaded fastener is utilized, the stud is generally positioned centrally with respect to the fasteners). The dimensions of plate member 18 can be increased to distribute the load over a larger area to accommodate variations in mounting requirements. The increase in dimensions will effect the mounting fastener dimension and the number utilized, the dimension of swivel 12, the dimensions of plate member 18 and the thickness and diameter of ring 26. FIG. 6 illustrates the use of two threaded apertures 22 and FIG. 7 illustrates the use of three threaded apertures 22, the corresponding fasteners not being illustrated.

The present invention thus provides a fastener device for anchoring a load to a base which is less costly and less complex than prior anchoring fasteners since the shear and tension portion of the device is separated from the base securing member.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A non-releasable swivel coupling device for coupling a load to a base member comprising:

an anchor plate having top and bottom sides formed with a fastener bore and a swivel socket, said swivel socket being further formed with an enlarged-in-diameter, downwardly opening recess extending to said bottom side and a retainer collar formed with a reduced-in-diameter, uninterrupted circular wall defining an aperture opening upwardly from said recess to said top side of said plate;

a one piece, unitary swivel formed with an enlarged-in-diameter head received in said recess to be unreleasably locked below said collar and further formed with an upstanding cylindrical swivel shank having a pivot axis and projecting through said aperture, said shank being formed at a location above said collar with a through cross bore, said core bore having a closed substantially circular cross section; and an endless circular lock ring received pivotably in said cross bore for rotation in opposite lateral directions in said cross bore, said lock ring having an outside diameter larger than said aperture to cooperate with said head to permanently lock said swivel to said collar to prevent dissociation of said swivel from said plate whereby said swivel is permanently locked to said anchor plate, whereby said swivel may be assembled during manufacture by inserting said shank upwardly from said bottom side and said ring connected through said cross bore.

2. The non-releasable swivel coupling device according to claim 1 wherein:

said cross bore is of an arcuate configuration to complement the shape of said ring.

3. The non-releasable swivel coupling device according to claim 1 wherein:

said anchor plate is rectangular is plan view and is formed with said aperture disposed adjacent one end thereof and said fastener bore disposed adjacent the opposite end thereof.

4. The non-releasable swivel coupling device according to claim 3 that includes:

a fastener bolt in said fastener bore.

* * * * *